United States Patent [19]
Morikawa et al.

[11] Patent Number: 5,178,891
[45] Date of Patent: Jan. 12, 1993

[54] METHOD FOR STRETCHING DOUGH

[75] Inventors: Michio Morikawa; Torahiko Hayashi, both of Utsunomiya, Japan

[73] Assignee: Rheon Automatic Machinery Co., Ltd., Utsunomiya, Japan

[21] Appl. No.: 761,539

[22] Filed: Sep. 17, 1991

[30] Foreign Application Priority Data

Sep. 20, 1990 [JP] Japan ................... 2-250762

[51] Int. Cl.⁵ ............................................ A21D 8/00
[52] U.S. Cl. ..................................... 426/502; 426/517
[58] Field of Search ............... 426/496, 502, 512, 517; 425/335, 363, 373

[56] References Cited

U.S. PATENT DOCUMENTS

| | | | |
|---|---|---|---|
| 2,735,379 | 2/1956 | Stiles | 426/502 |
| 3,894,828 | 7/1975 | Moline et al. | 425/335 |
| 4,692,110 | 9/1987 | Hayashi | 425/373 |
| 4,904,491 | 2/1990 | Morikawa et al. | 426/502 |

FOREIGN PATENT DOCUMENTS

| | | |
|---|---|---|
| 309005 | 3/1989 | European Pat. Off. |
| 326404 | 8/1989 | European Pat. Off. |
| 386988 | 9/1990 | European Pat. Off. |
| 410818 | 1/1991 | European Pat. Off. |

Primary Examiner—George Yeung
Attorney, Agent, or Firm—Guy W. Shoup; Patrick T. Bever

[57] ABSTRACT

A method and apparatus is disclosed for stretching and thinning dough. This apparatus consists of a plurality of conveyors 2,3, which are disposed in series so that the traveling speed of the downstream conveyor 3 is higher than that of the upstream conveyor 2, a roller 5 that reciprocates over a given distance $l_2$ transverse to the traveling direction of the dough, while reciprocating over a given distance $l_1$ in the traveling direction, and a roller 4 that reciprocates over a given distance $l_1$ in the traveling direction in synchronism with the transverse roller. The number of reciprocating strokes and the speed of both rollers are regulated to obtain a sheet of high quality dough with a uniform texture.

2 Claims, 6 Drawing Sheets

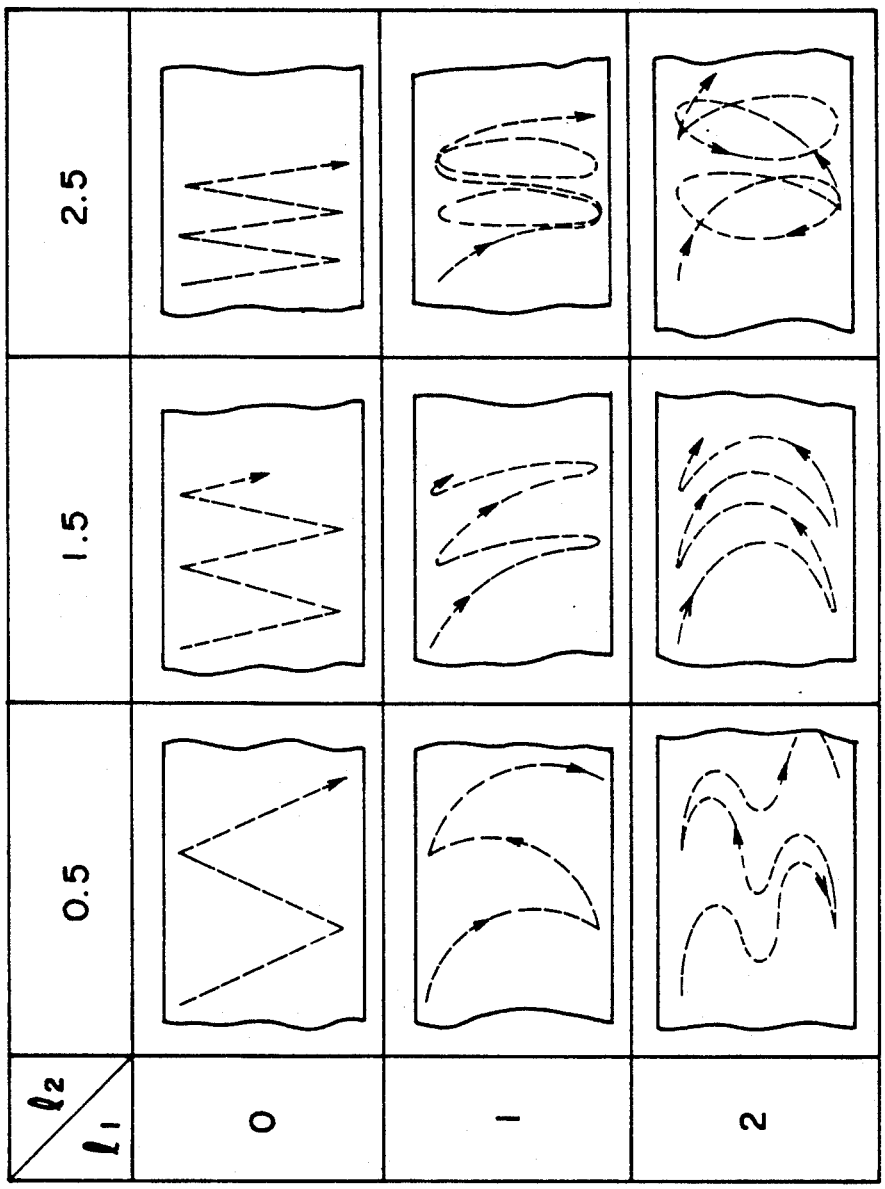

METHOD FOR STRETCHING DOUGH

FIELD OF THE INVENTION

This invention relates to the stretching of bread or cake dough. More particularly, it relates to a method and apparatus whereby dough can always be stretched and formed in a condition of uniform quality without its inner texture being destroyed.

PRIOR ART

A prior art apparatus has been disclosed in U.S. Pat. No. 4,692,110 owned by the assignee of the present application. In it a plurality of conveyors that are driven at different speeds are arranged in series, and rollers are disposed thereabove to freely rotate and to reciprocate in the traveling direction of the conveyors, so that the dough placed thereon is stretched to produce a dough sheet of a uniform thickness.

This prior art technique is effective in stretching and thinning dough while it passes between the conveyors and rollers and is being compressed by means of the rollers. However, if flour dough is stretched, it has only a limited effect; namely, the stretching effect is limited to the traveling direction of the conveyor.

This is because the protein of the dough stretched in that direction hardens as it is stretched, thereby substantially preventing any stretching in other directions.

SUMMARY OF THE INVENTION

This invention aims to enhance the stretching effect by simultaneously stretching the dough in a direction transverse to the traveling direction of the conveyor.

It is an object of this invention to provide an effective method of stretching dough into a thin sheet of a uniform thickness.

It is another object of this invention to provide a method for simultaneously stretching dough in the longitudinal and lateral directions.

It is a further object of this invention to provide an apparatus having a roller that reciprocates in the transverse and longitudinal directions so that the dough can be stretched in more than one direction.

In one aspect of this invention, a method of stretching dough is provided whereby the method consists of reciprocating a roller in both the transverse and longitudinal directions such that the roller stretches the dough being conveyed on a conveyor in more than one direction, to obtain an improved stretching effect.

In another aspect of this invention an apparatus for stretching dough is provided wherein a first roller, with its axis aligned parallel to the traveling direction of a conveyor, is such that it reciprocates over a given distance in a direction lateral to the traveling direction of a conveyor while reciprocating over a given distance in the traveling direction, and wherein a second roller disposed downstream of the first roller, with its axis positioned ataright angle to the traveling direction, is arranged to reciprocate over a given distance in synchronism with the first roller. The rollers are simultaneously reciprocated over a given distance in the traveling direction and over a given distance transverse direction, to stretch the dough. The speed of the movement of each of these rollers in each direction can be adjusted, thereby the locus of the rolling of the rollers can be freely changed.

The selection of the locus of the rolling movements enables the apparatus to stretch the dough in various directions so that a sheet of dough of a uniform thickness and of a uniform quality is formed in a highly effective manner.

BRIEF DESCRIPTION OF DRAWINGS

FIG. 8 is a schematic diagram illustrating the loci of rollers used in this invention.

DESCRIPTION OF THE PREFERRED EMBODIMENT

Figure 1:
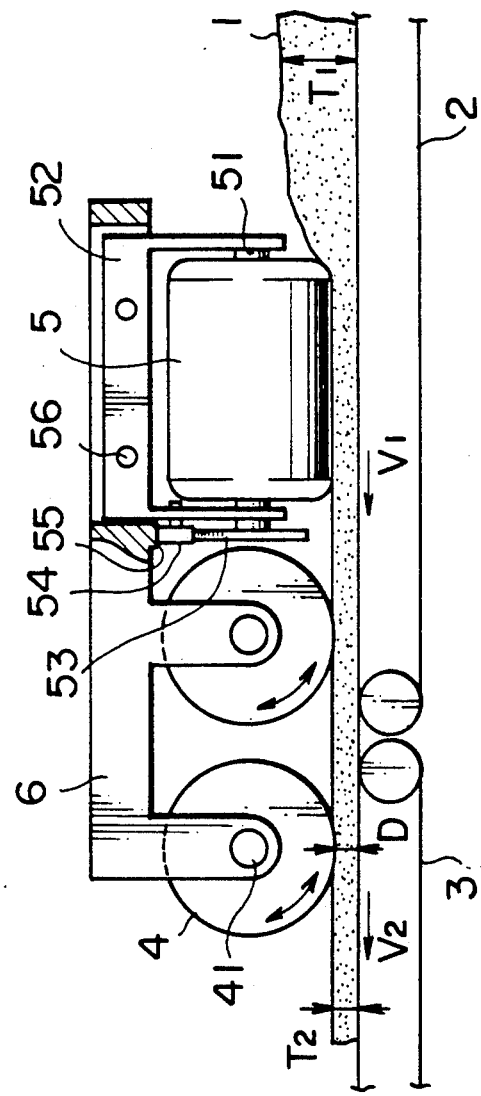
FIG. 1 is a side view of a roller assembly of an embodiment of this invention.

In FIG. 1 an upstream conveyor 2 and a downstream conveyor 3 are disposed in series. The upstream conveyor 2 receives from an upstream source an indeterminate form of a continuous mass of dough 1. The upstream and downstream conveyors are independently driven by their respective motors (not shown), so that the downstream conveyor 3 is driven at a higher speed than the upstream conveyor 2.

Three rollers 4, 4' and 5 are supported by a roller frame 6, which is in turn slidably supported by the frame for the apparatus (not shown), so that the frame 6 can reciprocate over a given distance $l_1$ in the traveling direction of the conveyor.

The rollers 4, 4' are disposed above the conveyors, and are spaced apart from the downstream conveyor 3 by a given distance D, so that they bridge the conveyors, and their axes are perpendicular to the traveling direction of the dough on the conveyors. The reciprocation of the frame 6 causes the rollers 4, 4' to reciprocate over a given distance $l_1$ (FIG. 2) in the traveling direction while rolling.

A roller 5 is disposed upstream of the rollers 4, 4'. The gap between the conveyor and the roller 5 is the same as or a little larger than the gap D between the conveyor 3 and the roller 4.

Figure 2:
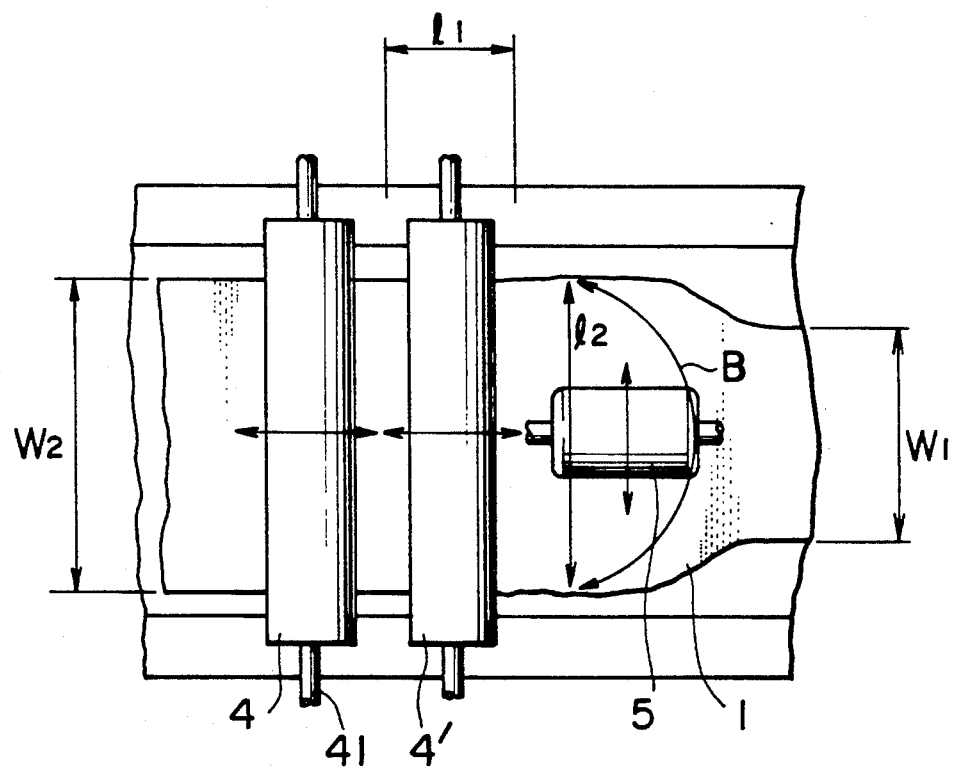
FIG. 2 is a schematic top view of the roller assembly of the embodiment.
Figure 4:
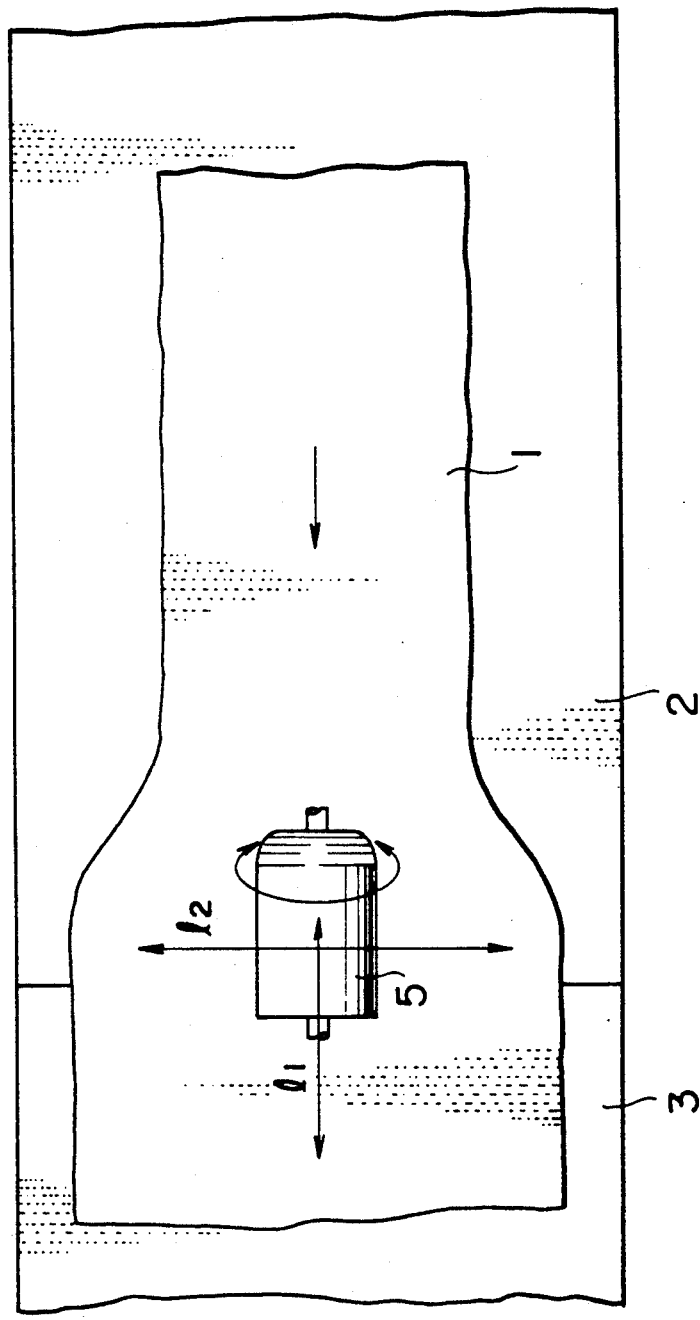
FIG. 4 is a partial top view of a first roller of the embodiment.

The roller 5 is oriented at right angles with the rollers 4, 4', its axis being aligned with the traveling direction of the dough on the conveyors and as shown in FIGS. 2 and 4. It reciprocates over a given distance $l_2$.

The roller 4 is mounted on a shaft 41. A sprocket 42 is mounted on the shaft 41 and fixed thereto.

The sprocket 42 meshes with a chain 71 that is driven by a variable-speed motor 7 so that it goes around two sprockets that are positioned spaced apart from each other by a preset distance. The chain moves parallel to the conveyors.

The shaft 41 is pivotally mounted on one end of a crank rod 81. The crank rod 81 is driven by another variable-speed motor 8 so that the shaft 41 is simultaneously rolled and reciprocated through the movement of the sprocket 42 on the chain 71 and caused by the reciprocating crank motion of the crank rod 81.

Hence, when the crank rod 81 is operated, the roller 4 can be rolled and reciprocated by means of the operation of the sprocket 42, which is reciprocated by the motor 8 through the crank rod 81 on the chain 71.

The rollers 4 and 4' are connected via a belt 43 so that the movement of the roller 4 is transmitted to the other roller 4', and so that the latter can roll and proceed back and forth in the same manner as the roller 4. By means of the transmission ratio of the belt 43, the diameters of pulleys attached to the rollers are adjustable so that the peripheral speed of the upstream roller 4' is kept lower than that of the downstream roller 4.

In this embodiment the variable-speed motor 7 is adjusted such that the speed of the movement of the chain 71 is the same as the speed of the downstream conveyor 3. The roller 4 is reciprocated so that it moves between the upstream and downstream conveyors 2, 3. By adjusting the variable motor 7 and the transmission belt 43, the peripheral speed of the roller 4' is forcedly kept higher than the speed of the upstream conveyor 2 and slower than the speed of progress at which it rolls over the downstream conveyor 3 without causing substantially any friction with the dough.

The shaft 51, on which the roller 5 is mounted, is supported at both ends by the arms of a U-shaped slider 52. A pinion 53 is mounted on one end of the shaft 51. A small-diameter pinion 54 is mounted on a wall of the slider 52 so as to mesh with the pinion 54.

The pinion 54 engages a rack 55, which is fixed on the frame 6 in the direction transverse to the conveyor.

The slider 52 is slidably mounted on two rods 56 that span the frame 6 in the direction transverse to the axis of the shaft 51.

The roller 5 is driven by an independent power device, such as a rotary actuator or a reversible motor (not shown), which is mounted on the shaft 51 to roll the roller 5. The roller 5 is made to reciprocate by means of the pinions 53, 54, and the rack 55.

Figure 3:
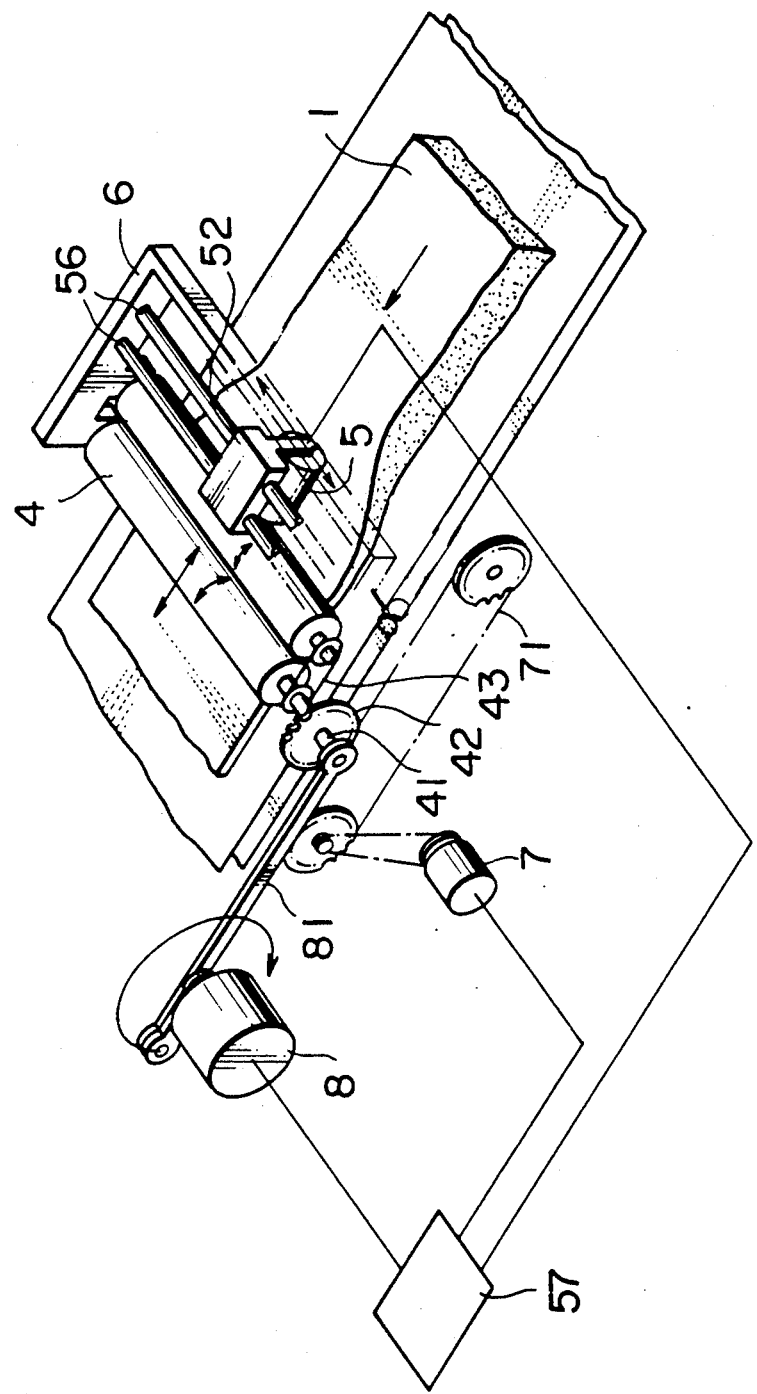
FIG. 3 is a partial perspective view of the apparatus of the embodiment.

The moving speed of the roller 5 can be changed by a regulator 57 (FIG. 3).

In a first embodiment, as shown in FIG. 2, the rolling locus of the roller 5 is such that when the roller makes one reciprocating stroke in the direction of the movement of the conveyors over the distance $l_1$, it makes one-half of a reciprocating stroke in the transverse direction over the distance $l_2$, so that the dough 1 being carried on the conveyor is stretched by the roller moving along the locus formed by the combined lengthwise and sidewise movements of the roller.

FIG. 8 shows nine combined loci that are formed. While the roller makes no stroke, or makes one or two reciprocating strokes in the lengthwise direction over the distance $l_1$, it makes a half, one and a half, or two and a half reciprocating strokes in the transverse direction over the distance $l_2$. The loci thus obtained are as shown in FIG. 8. If the roller makes no stroke in the lengthwise direction while it makes a half stroke in the transverse direction, the upper left locus will be given produced. If the strokes in the transverse direction are increased to 1.5, the upper middle locus will be given. If the transverse strokes are increased to 2.5, the upper right locus will be given. If the roller makes one stroke in the lengthwise direction over the distance $l_1$, while it makes half a stroke transverse, the locus will be as shown in the second block on the lefthand column.

In the embodiments of this invention the roller affects the surface of the dough in various directions, so that dough having an inner texture of a uniform quality, in any direction, can be obtained.

Further, the rollers 4, 4' of this invention stretch dough in the downstream and upstream directions in such a manner that the thickness of the dough can be adjusted.

Figure 5:
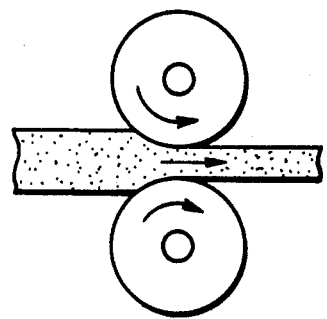
FIGS. 5, 6, and 7 are side views of roller assemblies used in conventional stretchers.
Figure 6:
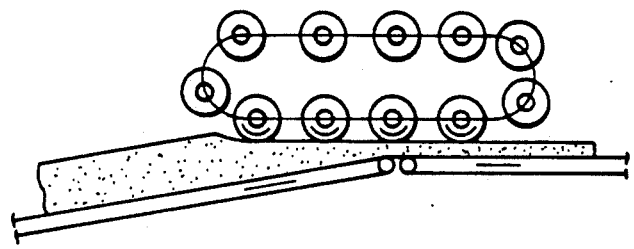
Figure 7:
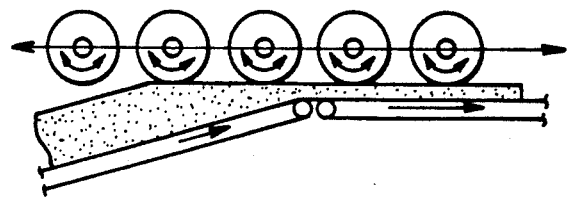

Experiments to evaluate the effects of this invention for bread dough showed that when a dough sheet 20 mm thick was stretched by the conventional rollers shown in FIGS. 5, 6, and 7, each under similar conditions, the resulting sheets of dough were 10, 5, and 5 mm thick, respectively.

In contrast, under the same experimental conditions the apparatus of this invention achieved a sheet of dough 2 mm thick. Namely, the reduction ratio of the embodiment of this invention was 1:10, while that of the conventional rollers was 1:4 or 1:2. This proves the remarkable advantage of this invention.

The Effects of the Invention

As is explained above, by providing rollers that reciprocate in both the direction of travel of dough and the transverse direction, the method and apparatus of this invention can stretch dough in various directions so that a sheet of a high quality dough with a uniform texture and thickness can be obtained from a continuous mass of dough conveyed in an indeterminate shape.

We claim:

1. A method of stretching dough comprising:
   transporting the dough in a traveling direction;
   rolling a pressure roller on a surface of the dough in a direction lateral to the traveling direction of the dough, while reciprocating the roller in the traveling direction.

2. A method of stretching a continuous mass of dough being conveyed on at least one conveyor, the at least one conveyor transporting the dough in a traveling direction, comprising:
   rolling a first pressure roller on a surface of the dough in a direction parallel to the traveling direction, while reciprocating the first roller in the traveling direction, and
   rollingly reciprocating a second pressure roller on the surface of the dough in a direction lateral to the traveling direction of the dough, while reciprocating the second roller in the traveling direction.

* * * * *